March 13, 1928.

C. H. KERR

FUSED QUARTZ TRANSILLUMINATOR

Filed April 5, 1926

1,662,150

Inventor
Charles H. Kerr.
By Harry H. Styll
Attorney

Patented Mar. 13, 1928.

1,662,150

UNITED STATES PATENT OFFICE.

CHARLES H. KERR, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

FUSED-QUARTZ TRANSILLUMINATOR.

Application filed April 5, 1926. Serial No. 99,817.

This invention relates to diagnostic illuminating instruments and has particular reference to an improved fused quartz transilluminator designed primarily for illuminating the human eye.

The principal object of this invention is to provide a quartz illuminator and means for illuminating the same, the quartz illuminator being made in such shape that it can be approached closely to the eye without interference from the rest of the instrument.

Another object of the invention is to provide heat absorbing means between the quartz transilluminator and the illuminating means to prevent the quartz transilluminator from becoming hot.

Another object of the invention is to provide an offset illuminating means in one piece of material which will have the high properties of transmitting light from the source of light.

Other objects and advantages of the invention will become apparent from the following description taken in connection with the accompanying drawings, and it will be apparent that I may make any modifications in the specific details of construction and arrangement of parts without departing from the spirit of the invention as expressed in the accompanying claims, the preferred form only of the invention being shown by way of illustration. I, therefore, do not wish to be limited to the exact details of construction and arrangement of parts shown.

Referring to the drawings, in which similar characters of reference are employed to denote corresponding parts throughout:

In the examination of the human eye it becomes at times important to examine it under a high and concentrated illumination, and it is desirable that this illumination be brought as close to the surface of the eye as possible without injury to the eye. In my invention I take advantage of that property of fused quartz of transmitting light through a lens made of that substance when a portion has been offset or bent. The use of such a lens possesses many advantages. It is cool and it does not require other mechanical fittings and bulky parts which would come in contact with the patient's face. It allows an efficient means of bringing the light close to the patient's eye and yet a light that can be so concentrated as to give the volume of intensity necessary.

Figure 1:
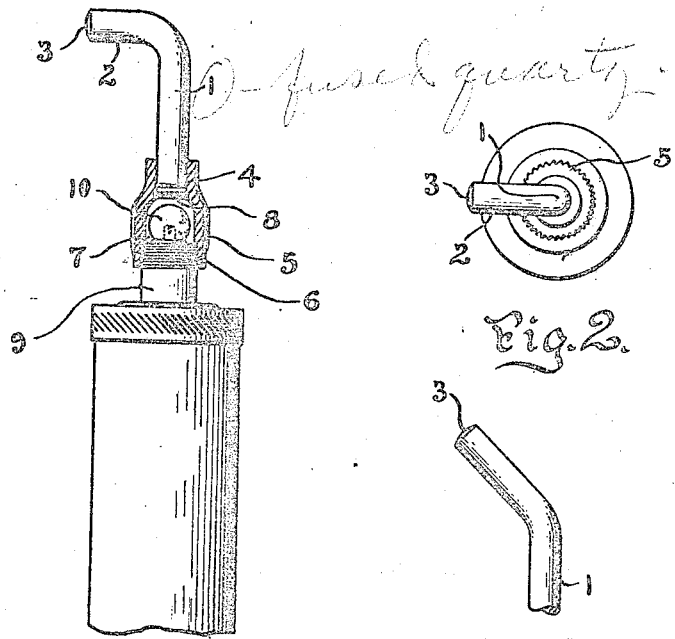
Figure 1 is a partial elevation of the transilluminator partially shown in section.
Figure 2:
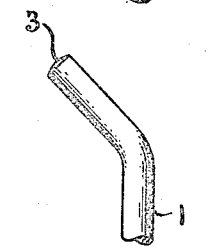
Figure 2 is a top plan view of Figure 1.
Figure 3:
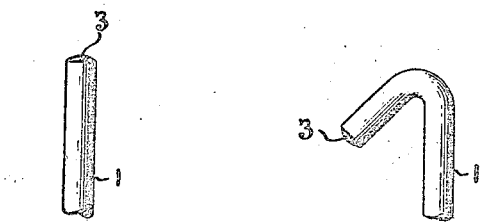
Figure 3 shows a fused quartz lens having an offset end of 45 degrees.
Figures 4, 5:
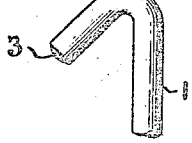
Figure 4 shows a fragmentary portion of a straight quartz lens.
Figure 5 shows a fragmentary portion of a bent quartz lens, the bent portion being bent at an acute angle to the center line of the straight portion.

Referring to the drawings, I provide a lens 1 of fused quartz which may be bent as at 2, in Figure 1, or as in Figures 3 and 4, or may be straight, as shown in Figure 4. I finish the outer end 3 with a curved lens surface and at the lower end 4 I mount the crystal in a metallic cap 5, securing it therein by cementitious means or otherwise. The cap 5 has the screw threaded annular portion 6 and the light chamber 7. If desired, I mount a lens or piece of heat absorbing glass 8 at the top of the chamber 7 below the end 4 of the quartz lens 1. This heat absorbing lens may be made of any well known prior art heat absorbing glasses, particularly those containing ferrous iron salts. The cap 5, by means of the screw threaded annulus 6, is secured onto the support 9 which carries an electric lamp 10 fitted into the light chamber 7. To the support 9 is secured the handle of the ordinary diagnostic instrument containing a source of electric energy, such as a battery or a plug connection for an outside source of electric energy, and light connecting means from the lamp to the source of energy. Means are also provided on the handle portion for turning on or off the current to illuminate the lamp. The rays of light from the lamp 10 are transmitted through the heat absorbing lens 8 and the fused quartz lens 1 to the eye of the patient.

The cap 5 being removable on the screw threaded annulus 6, permits the device to be interchangeably used with other types of diagnostic instruments; hence this transilluminator may become a part of an ordinary standard diagnostic set such as is used by oculists. By removing the cap 5 also access to the heat absorbing lens 8 is had, allowing it to be put in place or removed as desired.

From the foregoing description it will be seen that I have provided a very simple and efficient instrument well adapted to obtain the objects of the invention.

Having described my invention, I claim:

1. In a device of the character described, a handle having a screw threaded terminal portion, a lamp in the terminal portion, an annular cap having an internal screw threaded portion to fit the terminal portion of the handle, a lamp cavity beyond the screw threaded portions, a lens seat beyond the lamp cavity and an opening for a long rod like lens beyond the lens seat, a heat absorbing lens in the lens seat and a transparent long rod like lens in the opening in the annular cap and extending therebeyond.

2. In a device of the character described, a handle having a screw threaded terminal portion, a lamp in the terminal portion, an annular cap having an internal screw threaded portion to fit the terminal portion of the handle, a lamp cavity beyond the screw threaded portion, a lens seat beyond the lamp cavity, an opening for a long rod like lens beyond the lens seat, a heat absorbing lens in the lens seat, a transparent long rod like lens in the opening in the annular cap and extending therebeyond, and means to secure the long rod like lens in the opening.

3. In a device of the character described, a handle having a screw threaded terminal portion, a lamp in the terminal portion, an annular cap having an internal screw threaded portion to fit the terminal portion of the handle, a lamp cavity beyond the screw threaded portion, a lens seat beyond the lamp cavity, an opening for a long rod like lens beyond the lens seat, a heat absorbing lens in the lens seat, a transparent long rod like lens in the opening in the annular cap and extending therebeyond, and cementitious means to secure the long rod like lens in the opening.

CHARLES H. KERR.